US008206656B2

(12) United States Patent
Goebelbecker

(10) Patent No.: US 8,206,656 B2
(45) Date of Patent: Jun. 26, 2012

(54) FREEZABLE-LIQUID DISPENSER FOR MOTOR VEHICLES

(75) Inventor: Michael Goebelbecker, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 844 days.

(21) Appl. No.: 12/182,764

(22) Filed: Jul. 30, 2008

(65) Prior Publication Data

US 2010/0028219 A1 Feb. 4, 2010

(51) Int. Cl.
*F01N 3/00* (2006.01)
*F01N 3/04* (2006.01)
*F01N 3/10* (2006.01)
*F01N 3/20* (2006.01)

(52) U.S. Cl. .......... 422/173; 60/286; 219/385; 219/438; 219/441; 392/441; 392/447; 392/449

(58) Field of Classification Search .................... 60/286; 219/202, 385, 438, 441, 482, 490, 496; 392/441, 392/447, 449; 222/67
See application file for complete search history.

(56) References Cited

U.S. PATENT DOCUMENTS 1,485,159 A * 2/1924 Bartholomew ............... 126/261
2,877,335 A * 3/1959 Relf ............................ 392/451
4,090,668 A 5/1978 Kochenour
4,609,106 A * 9/1986 Gentili .......................... 206/509
4,930,230 A 6/1990 Weckherlen et al.
5,235,823 A 8/1993 Coker
5,487,486 A * 1/1996 Meneo .......................... 220/504
6,164,564 A * 12/2000 Franco et al. .............. 239/284.1
6,295,831 B1 10/2001 Watson
6,330,955 B2 * 12/2001 Easler, Sr. ..................... 220/507
6,390,147 B1 5/2002 Channing
6,810,661 B2 11/2004 Lambert et al.
7,017,336 B2 * 3/2006 Stiermann ....................... 60/286
7,261,537 B2 * 8/2007 Mitz ............................ 425/143

(Continued)

FOREIGN PATENT DOCUMENTS

EP 1811145 7/2007

(Continued)

OTHER PUBLICATIONS

Machine Translation of Patent Application KR 2006090916 A.*

(Continued)

*Primary Examiner* — Kenneth Bomberg
*Assistant Examiner* — Brandon Lee
(74) *Attorney, Agent, or Firm* — Julia Voutyras; Alleman Hall McCoy Russell & Tuttle LLP

(57) ABSTRACT

A liquid dispenser includes an exterior surface and an interior surface. The interior surface encloses a volume that tapers outwardly in a downward direction so that any horizontal cross-section of the volume fits inside each horizontal cross-section below it from a full to an empty level of the dispenser. The interior surface also includes a projection oriented opposite the exterior surface and configured to limit a motion of solids within the dispenser. The structure so provided enables the solid, e.g., a frozen liquid, to slide to the heated, bottom portion of the dispenser as liquid is drawn from the dispenser thus providing faster melting.

13 Claims, 4 Drawing Sheets

U.S. PATENT DOCUMENTS

| | | | | |
|---|---|---|---|---|
| 2002/0056273 | A1 * | 5/2002 | Itoh et al. | 60/286 |
| 2002/0125269 | A1 * | 9/2002 | Lee | 222/67 |
| 2002/0137455 | A1 * | 9/2002 | Ivanov et al. | 454/157 |
| 2003/0033799 | A1 * | 2/2003 | Scheying | 60/286 |
| 2004/0129003 | A1 | 7/2004 | Voute et al. | |
| 2005/0036771 | A1 * | 2/2005 | Bauck et al. | 392/465 |
| 2006/0048503 | A1 * | 3/2006 | Havers | 60/286 |
| 2006/0130461 | A1 * | 6/2006 | Gabrielsson et al. | 60/286 |
| 2006/0186297 | A1 | 8/2006 | Lore, Sr. | |
| 2007/0089445 | A1 * | 4/2007 | Robinson | 62/259.1 |
| 2007/0157602 | A1 * | 7/2007 | Gschwind | 60/274 |
| 2007/0196243 | A1 | 8/2007 | Osaku et al. | |

FOREIGN PATENT DOCUMENTS

| | | | |
|---|---|---|---|
| EP | 1835136 | | 9/2007 |
| FR | 2858812 | A1 * | 2/2005 |
| JP | 11190575 | | 7/1999 |
| KR | 2006090916 | A * | 8/2006 |
| WO | 00/21881 | | 4/2000 |

OTHER PUBLICATIONS

Derwent for Patent Application KR 2006090916 A.*

Machine Translation of Patent FR 2858812 A!.*

* cited by examiner

FREEZABLE-LIQUID DISPENSER FOR MOTOR VEHICLES

TECHNICAL FIELD

The present application relates to the field of fluidics, and more particularly to managing fluid flow and/or storage in motor vehicles.

BACKGROUND AND SUMMARY

A motor vehicle may carry a freezable liquid in a dispenser. Examples of freezable liquids include water, windshield washer, and urea mixtures for use in emissions control. During operation, the motor vehicle may draw the liquid from the bottom of the dispenser. At low temperatures, however, the liquid may freeze to solid form and require thawing prior to being drawn out. Thus, in some applications, it may be advantageous to provide heat to the dispenser to thaw the solid, and thereby reclaim the liquid.

The rate of thawing may depend on the detailed geometry of the dispenser. Although a dispenser may be designed to have substantially parallel walls, various factors may cause the walls to be non-parallel. Finite dimensional tolerances of the dispenser, which arise during manufacturing, are one such factor. Another factor is that the dispenser may deform subsequent to manufacturing—because it is made of a pliable material or because of expansion, on freezing, of a liquid within it. If the walls taper even slightly inward from the top of the dispenser to the bottom, a frozen solid may be held up and be slow to reach a heated bottom portion of the dispenser. As the thawed liquid is drawn out, further thawing may be limited by convective heat transfer through an air-filled zone at the bottom portion. This effect may limit the rate at which liquid may be drawn from the dispenser.

Additionally, when a liquid is thawed in a container having substantially parallel walls, the remaining solid—if it is less dense than the liquid—may float to the top, and convective heat transfer from the bottom of the container to the frozen solid above may be slow. Therefore, U.S. Pat. No. 5,235,823 discloses a container in which ice is thawed to provide cooling, wherein the walls of the container taper outward from the top of the container to the bottom. In this container, the taper prevents ice from floating to the top of the liquid and thereby increases the rate of heat transfer.

In the cited reference, heat is transferred to the ice through the walls of the container. Additional problems may arise, however, if heat is provided by an immersion heater set in the container, and the container is disposed in a motor vehicle. In a motor vehicle, where vibration and acceleration may be significant, the possibility of unthawed solids moving freely within the container and contacting the immersion heater may be unacceptable. Further, the problem of the frozen portion floating to the top of the liquid may be irrelevant if the liquid is drawn out of the container and delivered elsewhere during the melting process.

The inventor herein has recognized the above problems and issues and has devised a series of approaches to address them. Thus, in one embodiment, a liquid dispenser is provided. The dispenser includes an exterior surface and an interior surface. The interior surface encloses a volume that tapers outwardly in a downward direction so that any horizontal cross-section of the volume fits inside each horizontal cross-section below it from a full to an empty level of the dispenser. The interior surface also includes a projection oriented opposite the exterior surface and configured to limit a motion of solids within the dispenser.

Another embodiment provides a system for delivering a liquid to a motor-vehicle component such as an exhaust-aftertreatment device. The system includes a liquid dispenser as described above and a conduit coupled to an opening at a bottom portion of the dispenser. The conduit is configured to conduct the liquid to the motor-vehicle component. The system also includes a heater operatively coupled to a controller and configured to heat at least the bottom portion of the dispenser.

The structure so provided enables the solid to slide to the heated, bottom portion of the dispenser as liquid is drawn from the dispenser. This configuration reduces limitations on the rate of thawing of the solid related to the rate of mass transport to the heated, bottom portion of the dispenser. Also, if the solid melts faster than the liquid is drawn from the dispense, the structure holds the solid portion down to increase heat transfer to the solid via the structure.

Other embodiments disclosed herein provide different variants of the dispenser, and methods for delivering a liquid to an exhaust-aftertreatment device in a motor-vehicle in accordance with the disclosed configurations.

It should be understood that the summary above is provided to introduce in simplified form a selection of concepts that are further described in the Detailed Description. It is not meant to identify key or essential features of the claimed subject matter, the scope of which is defined uniquely by the claims that follow the Detailed Description. Furthermore, the claimed subject matter is not limited to implementations that solve any disadvantages noted above or in any part of this disclosure.

DETAILED DESCRIPTION

Figure 1:
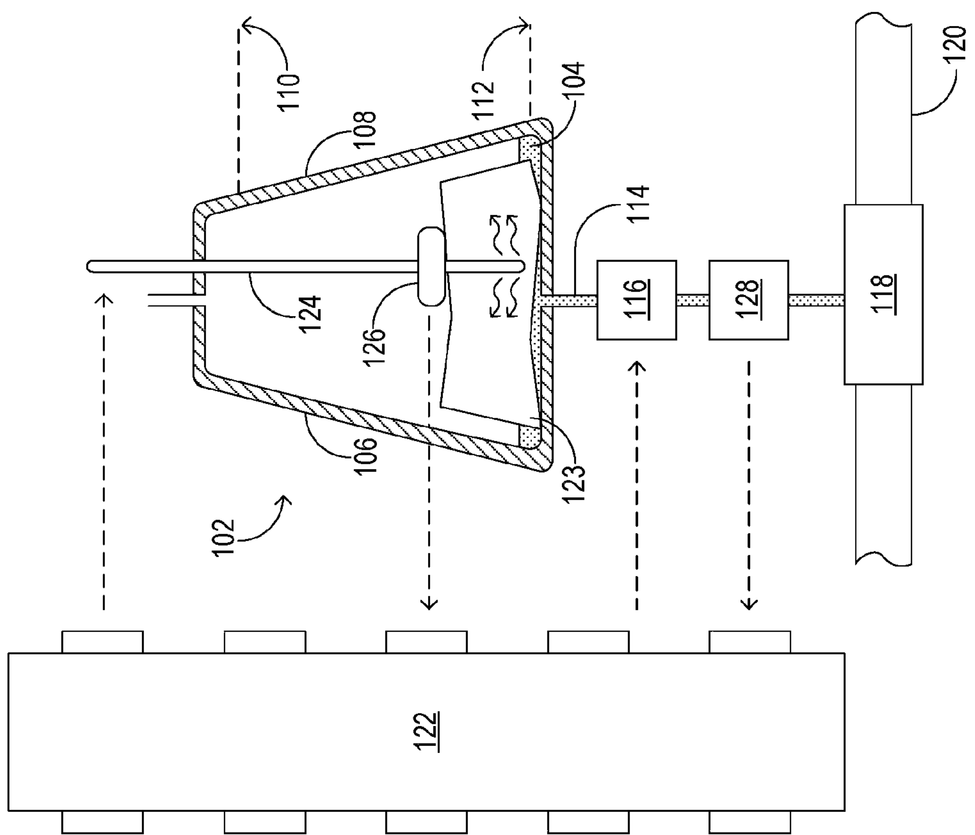
FIG. 1 shows an example system for delivering a liquid to an exhaust-aftertreatment device in a motor vehicle, in accordance with the present disclosure.

FIG. 1 shows, in schematic detail, an example system for delivering a liquid to an exhaust-aftertreatment device in a motor-vehicle. In some embodiments, the liquid may include a reductant-containing mixture, e.g., a urea-containing mixture. The exhaust-aftertreatment device may include a NOx trap.

FIG. 1 shows dispenser 102 configured to contain liquid 104. A vertical cross-section of the dispenser includes opposing first and second wall segments 106 and 108. The horizontal distance between the first and second wall segments, at the level of the liquid, increases continuously as the level descends from substantially full level 110 to substantially empty level 112.

Figure 2A:
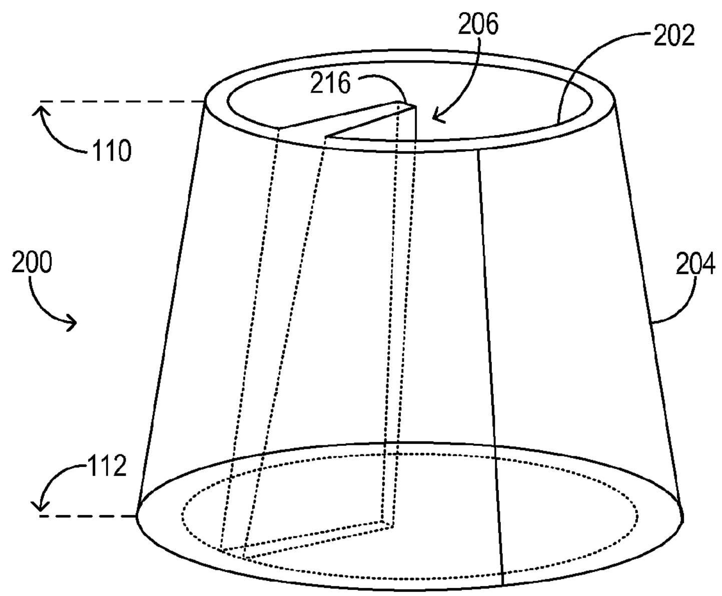
FIG. 2A shows a section of an example dispenser, in accordance with the present disclosure.

FIG. 2A shows section 200 of example dispenser 102, which extends from substantially full level 110 to substantially empty level 112. The illustrated section includes interior surface 202 and exterior surface 204. The interior surface is configured to contain a liquid so that the level of the liquid is between the substantially full level and the substantially empty level. As shown in FIG. 2A, the interior surface of the dispenser includes projection 206 oriented opposite the exterior surface. The projection is configured to limit a motion of solids within the dispenser. In other embodiments, the interior surface may include a plurality of projections oriented opposite the exterior surface and configured to limit a motion of solids within the dispenser. In one example, the dispenser may include three projections substantially equivalent to projection 206, each radiating from the center of the dispenser and set 120° apart from each other. Other embodiments may include two projections, four, five, etc. In the illustrated embodiment, an inner edge 216 of the projection oriented toward the center of the dispenser is oblique, and is biased in the same direction as the tapering of the interior surface. In other embodiments, the inner edge projection 216 may be substantially vertical, or may have a bias different than that of the tapering of the interior surface.

In the illustrated embodiment, each horizontal cross section of the interior surface of the dispenser between the substantially full level and the substantially empty level defines a circle; the one, illustrated projection is aligned along a vertical plane that contains a radius of the circle. In embodiments that include a plurality of projections and wherein a horizontal cross section of the interior surface defines a circle, one or more of the projections may be aligned along vertical planes that contain radii of the circle.

Figure 2B:
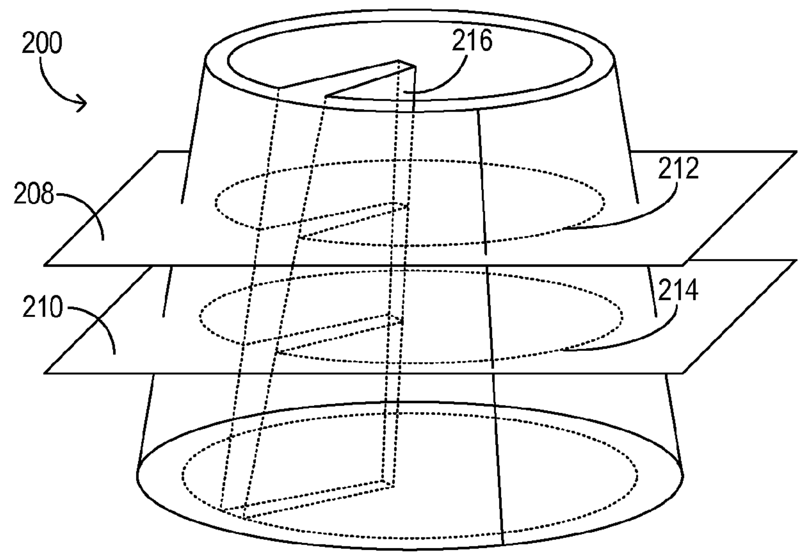
FIG. 2B shows the section of FIG. 2A intersected by a pair of horizontal planes, in accordance with the present disclosure.

FIG. 2B shows section 200 intersected by upper horizontal plane 208 and lower horizontal plane 210. FIG. 2B also shows upper intersection 212 and lower intersection 214. Upper intersection 212 is a geometric figure defined by the intersection of interior surface 102 with the upper horizontal plane; lower intersection 214 is a geometric figure defined by the intersection of the interior surface with the lower horizontal plane. The shape of section 200 provides that the upper intersection is fittable inside the lower intersection, absent rotation of either intersection, for any upper horizontal plane between the substantially full level and the substantially empty level, and for any lower horizontal plane between the upper horizontal plane and the substantially empty level.

Figure 2C:
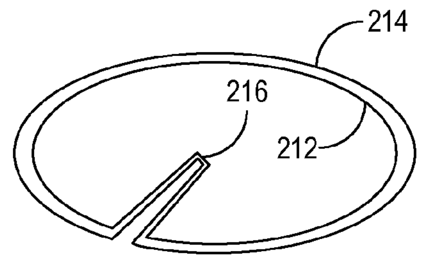
FIG. 2C shows the intersections of FIG. 2B translated into the plane of the page, in accordance with the present disclosure.

FIG. 2C shows upper intersection 212 and lower intersection 214 translated into the plane of the page, the translation occurring without rotation of either intersection. This drawing shows that the upper intersection is fittable inside the lower intersection.

It will be understood from this example that fittability of the upper intersection within the lower intersection may, in certain embodiments, require not only an outward tapering of the walls of the dispenser but also a continuous waning of projection 206 from substantially full level 110 to substantially empty level 112. Such waning may further include a decrease in one or more dimensions of a horizontal cross section of the projection—i.e., a thinning of the projection and/or a shortening of the projection. In one, non-limiting example, a thickness of the projection at the substantially full level may be 1.5 times the thickness of the projection at the substantially empty level. Accordingly, in embodiments that comprise a plurality of projections akin to projection 206, each of the plurality of projections may wane continuously from the substantially full level to the substantially empty level.

Further, it will be understood that the absolute and relative dimensions of the illustrated dispenser, the illustrated projection, and other parts of the system were chosen to emphasize various features and functions of the system, and for other illustrative purposes, and may be varied from the scale illustrated in the depicted embodiment.

Returning now to FIG. 1, the illustrated embodiment further includes liquid conduit 114, valve 116, exhaust-aftertreatment device 118, exhaust conduit 120, and controller 122. The exhaust conduit may comprise a plurality of segments, those segments interrupted by various devices, which include the exhaust-aftertreatment device. The exhaust-aftertreatment device is configured to receive engine exhaust from one segment of the exhaust conduit and to release treated engine exhaust into another segment of the exhaust conduit. The liquid conduit may likewise comprise a plurality of segments interrupted by various devices. In the illustrated embodiment, the liquid conduit is configured to conduct at least some of the liquid from the dispenser to the exhaust-aftertreatment device. As shown in the drawing, the liquid conduit penetrates the dispenser. Specifically, the interior surface of the dispenser defines an opening below the substantially empty level. The opening is configured to allow at least some of the liquid to flow out of the dispenser. In the illustrated embodiment, the opening is a terminus of the liquid conduit.

In the illustrated embodiment, liquid conduit 114 is interrupted by valve 116, and the valve is actuable by controller 122. Further, the controller is configured to actuate the valve, and thus, to control a flow of the liquid from the dispenser and to the exhaust-aftertreatment device.

In FIG. 1, solid 123 is shown within dispenser 102 and is disposed substantially above the level of liquid 104. The solid may be a frozen form of the liquid; it may form spontaneously when the temperature in the dispenser falls below the freezing point of the liquid. Thus, depending on temperature, the dispenser may include one or more substances from a group consisting of the liquid and a solid derived by freezing the liquid.

The illustrated embodiment further includes heater 124, level sensor 126, and flow sensor 128. The heater shown in the drawing is at least partly interior dispenser 102, is operatively coupled to controller 122, and is configured to provide heat to at least a bottom portion of the dispenser. In some embodiments, the heater may include an electrical heating element. The level sensor is operatively coupled to the controller and responsive to an amount of the one or more substances in the dispenser. In some embodiments, the level sensor may include a float. The flow sensor is operatively coupled to the controller and responsive to a flow of liquid from the dispenser.

In some embodiments, controller 122 may be further configured to regulate a flow of heat from the heater in response to an amount of the one or more substances in the dispenser, in addition to regulating the flow of liquid from the dispenser. In particular, the controller may be configured to increase the flow of heat from the heater when the amount of the one or more substances in the dispenser is above a first threshold and when the flow of liquid from the dispenser is below a second threshold. The controller may further be configured to decrease the flow of heat from the heater when the amount of the one or more substances in the dispenser is below a first threshold or when the flow of liquid from the dispenser is above a second threshold. To estimate the amount of the one or more substances in the dispenser, the controller may interrogate or receive an output from level sensor 126. To estimate the flow rate, the controller may interrogate or receive an output from flow sensor 128.

The system shown by example in FIG. 1 may be configured for delivering a liquid reductant to an exhaust-aftertreatment device in a motor-vehicle. As shown, the system may include a vertically mounted dispenser in the motor-vehicle, an interior surface of the dispenser enclosing an outwardly tapering interior volume in a descending vertical direction. In such embodiments, the interior volume may be configured to hold the liquid reductant, and, as illustrated in the drawing, an exhaust injection supply connection may be coupled to a bottom portion of the vertically mounted dispenser. Further, a heater may be operatively coupled to the vertically mounted dispenser and configured to provide heat primarily to the bottom portion of the dispenser.

Figure 3:
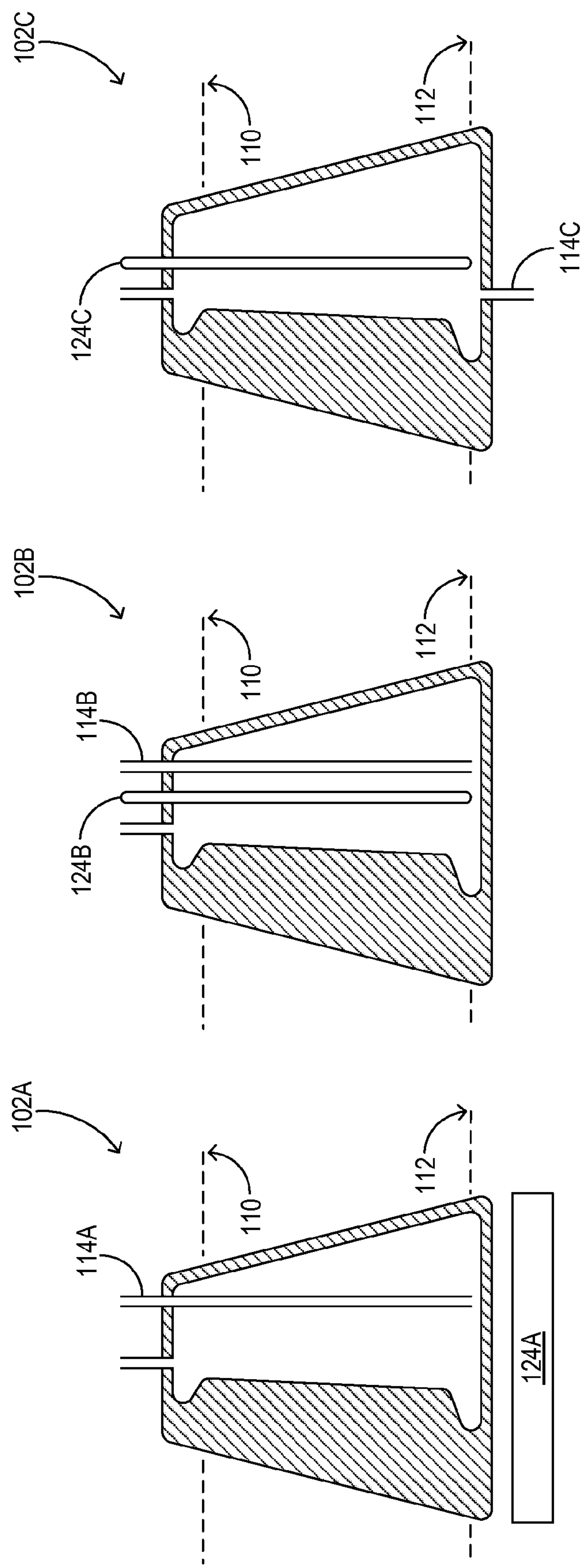
FIG. 3 shows in cross-section, three example embodiments of a dispenser, in accordance with the present disclosure.

FIG. 3 shows three example embodiments of dispenser 102 (viz. 102A, 102B, 102C) that differ with respect to the disposition of the liquid conduit and the heater.

In dispenser 102A, heater 124A is exterior the dispenser and below the dispenser. In this embodiment, liquid conduit 114A penetrates the dispenser from above.

In dispenser 102B, heater 124B is at least partly interior the dispenser. In this embodiment, liquid conduit 114B penetrates the dispenser from above.

In dispenser 102C, heater 124C is at least partly interior the dispenser. In this embodiment, liquid conduit 114C penetrates the dispenser from below.

Figure 4:
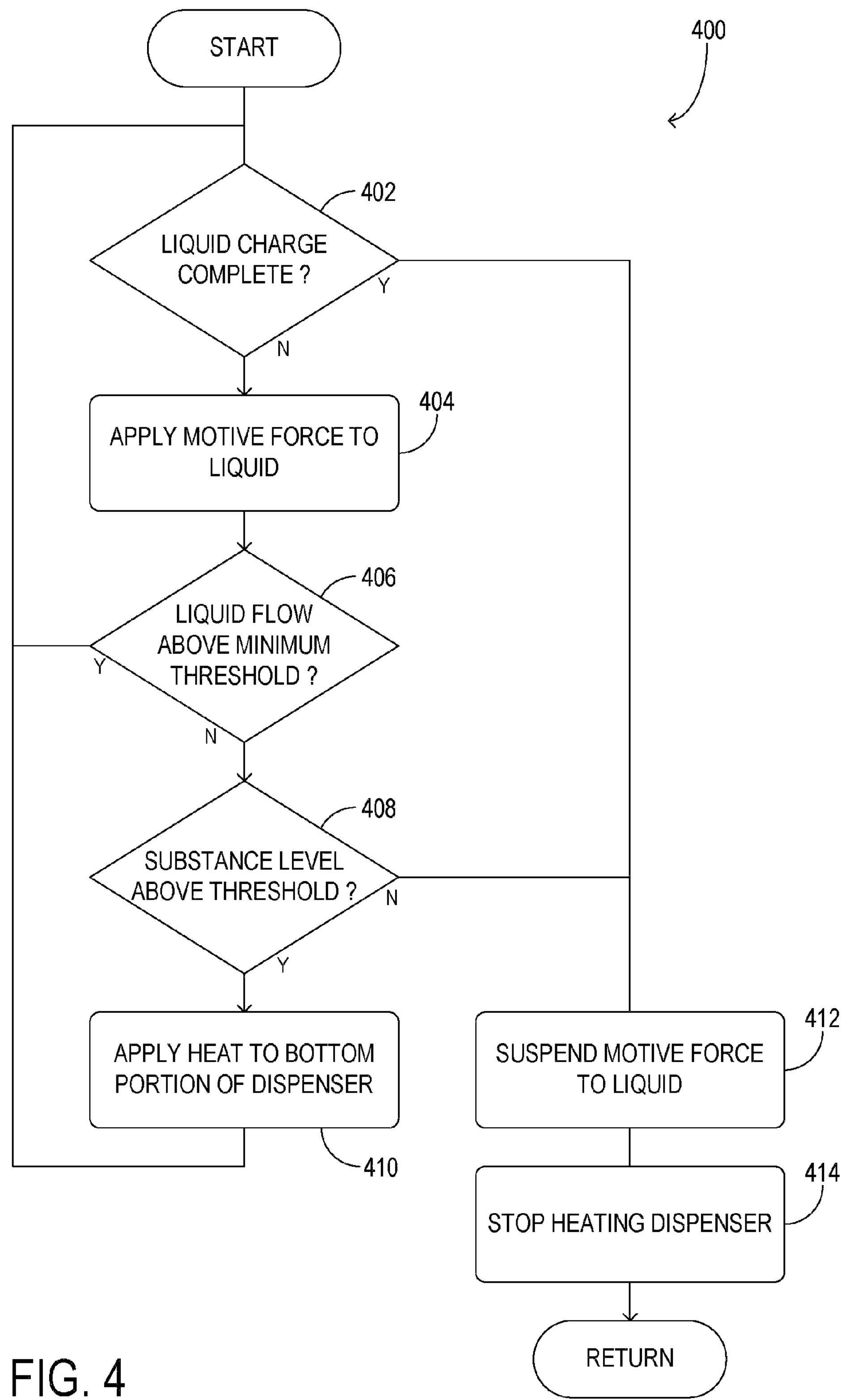
FIG. 4 shows an example process for delivering a liquid to an exhaust-aftertreatment device in a motor vehicle, in accordance with the present disclosure.

FIG. 4 shows example process 400 for delivering a liquid to an exhaust-aftertreatment device in a motor-vehicle. The process may be initiated by a motor-vehicle controller, such as controller 122 in FIG. 1; it may be initiated, for example, when a charge of the liquid to the exhaust-aftertreatment device is requested.

At 402, the controller determines whether the charge of liquid to the exhaust-aftertreatment device is complete, or whether additional liquid is to be supplied. If the charge of liquid is not complete, then the process proceeds to 404.

At 404, a motive force is applied to the liquid to draw it from the dispenser. The motive force may be applied in several different ways. In some embodiments, a valve disposed in a liquid conduit connecting the dispenser to the exhaust-aftertreatment device may be opened. Opening the valve may allow the liquid to flow from the dispenser under the force of gravity. If a pressure differential exists between the dispenser and the exhaust-aftertreatment device, the liquid may flow in response to the pressure differential when the valve is opened. In other embodiments, a pump disposed in the liquid conduit may be activated to draw the liquid from the dispenser to the exhaust-aftertreatment device. In some embodiments, the liquid may be drawn out of the dispenser faster than it accumulates due to a thawing the solid, such that the thawing of the solid effectively limits the rate of delivery of the liquid to the exhaust-aftertreatment device.

At 406, the controller determines whether the flow of liquid from the dispenser exceeds a minimum expected flow threshold. To make this determination, the controller may interrogate or receive an output from a flow sensor disposed in the liquid conduit. If the flow of liquid exceeds the minimum expected flow threshold, then the process returns to 402. But if the flow of liquid does not exceed the minimum expected flow threshold, then the process continues to 408.

At 408, the controller determines whether the level of one or more substances in the dispenser exceeds a minimum level threshold. To make this determination, the controller may interrogate or receive an output from a level sensor disposed in the dispenser. If the level of the one or more substances exceeds the minimum threshold, then, at 410, heat is applied to a bottom portion of the dispenser, and the process returns to 402.

Heat may be applied to at least a bottom portion of the dispenser in order to thaw the solid, the shape of which may conform to the inner surface of the dispenser. Thus, in some embodiments, step 410 may comprise heating a bottom portion of the dispenser, the dispenser including a solid formed from the liquid by freezing and configured to allow the solid to descend to the bottom portion of the dispenser when the dispenser is substantially emptied of the liquid. Further, by virtue of steps 406 and 408, the rate of heating at 410 may be responsive to the combined level of the solid and the liquid in the dispenser and further responsive to the flow of the liquid from the dispenser.

If the controller determines, at 402, that the liquid charge is complete, then, at 412, the motive force on the liquid is suspended. The motive force may be suspended, for example, by closing a valve and/or deactivating a pump disposed in a conduit connecting the dispenser to the exhaust-aftertreatment device. Then, at 414, the application of heat to the dispenser is discontinued. Steps 412 and 414 are also executed from 408, when it is determined that the level of substance in the dispenser does not exceed the minimum level threshold.

The example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in a control system. It should be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it should be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A liquid dispenser comprising:

an exterior surface; and an interior surface enclosing a volume that tapers outwardly in a downward direction so that any horizontal cross-section of the volume fits inside each horizontal cross-section below it from a full to an empty level of the dispenser, the interior surface including a projection oriented opposite the exterior surface, toward the center of the dispenser, and configured to limit a motion of solids within the dispenser, where the horizontal cross-sections of the volume include the projection, and any horizontal cross-section of the volume, including the projection, fits inside each horizontal cross-section of the volume, including the projection, below it, from the full to the empty level of the dispenser, and the projection tapers downwardly such that the projection becomes thinner along the downward direction from the full to the empty level of the dispenser, and the projection tapers inwardly becoming thinner along an inward direction from the interior surface to an inner edge of the projection which is oriented toward the center of the dispenser, and the projection becomes longer as measured from the interior surface to the inner edge in the downward direction from the full to the empty level of the dispenser.

2. The dispenser of claim 1, further comprising a heater configured to heat at least a bottom portion of the dispenser.

3. The dispenser of claim 2, wherein the heater is at least partly inside the dispenser.

4. The dispenser of claim 1 further comprising an opening at a bottom portion of the dispenser for releasing a liquid from the dispenser.

5. The dispenser of claim 1 wherein the projection is one of a plurality of projections of the interior surface oriented opposite the exterior surface and configured to limit the motion of solids in the dispenser.

6. A system for delivering a liquid to a component of a motor vehicle, the system comprising:

a liquid dispenser with an exterior surface and an interior surface, the interior surface enclosing a volume that tapers outwardly in a downward direction so that any horizontal cross-section of the volume fits inside each horizontal cross-section below it from a full to an empty level of the dispenser, the interior surface including a projection oriented opposite the exterior surface, toward a center of the dispenser, and configured to limit a motion of solids within the dispenser, the projection tapers outwardly such that the projection becomes thinner along the downward direction from the full to the empty level of the dispenser, and the projection tapers inwardly becoming thinner along an inward direction from the interior surface to an inner edge of the projection which is oriented toward the center of the dispenser, and the projection becomes longer as measured from the interior surface to the inner edge in the downward direction from the full to the empty level of the dispenser;

a conduit coupled to an opening at a bottom portion of the dispenser and configured to conduct the liquid to the component; and a heater operatively coupled to a controller and configured to heat at least the bottom portion of the dispenser.

7. The system of claim 6, wherein the liquid includes water.

8. The system of claim 6, wherein the liquid includes urea.

9. The system of claim 6, further comprising a level sensor operatively coupled to the controller and responsive to an amount of the liquid and/or solids in the dispenser.

10. The system of claim 6, further comprising a flow sensor operatively coupled to the controller and responsive to a flow of the liquid from the dispenser.

11. The system of claim 6 wherein the dispenser is mounted vertically in the motor vehicle.

12. The system of claim 6 wherein the component is an exhaust-aftertreatment component, and wherein the horizontal cross-sections of the volume include the projection, and any horizontal cross-section of the volume, including the projection, fits inside each horizontal cross-section of the volume, including the projection, below it.

13. The system of claim 6 further comprising a valve operatively coupled to the controller to control a flow of the liquid from the dispenser.

* * * * *